(12) United States Patent
Raahemi et al.

(10) Patent No.: US 6,614,805 B1
(45) Date of Patent: Sep. 2, 2003

(54) METHOD AND APPARATUS FOR MEDIA ACCESS CONTROL FOR PACKET TRANSMISSION OVER A BUFFER INSERTION RING

(75) Inventors: Bijan Raahemi, East Nepean (CA); Lutful Khan, Nepean (CA); Peter Martin Kenneth Cottreau, Ashton (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/320,585

(22) Filed: May 27, 1999

(51) Int. Cl.[7] .................................................. H04J 3/16
(52) U.S. Cl. ...................... 370/468; 709/251
(58) Field of Search ...................... 370/468; 709/251; 379/114.02

(56) References Cited

U.S. PATENT DOCUMENTS

| | | | | |
|---|---|---|---|---|
| 4,538,147 A | * | 8/1985 | Grow ........................ | 370/224 |
| 4,926,418 A | | 5/1990 | Cidon et al. | |
| 5,229,993 A | * | 7/1993 | Foudriat et al. ............ | 370/445 |
| 5,446,737 A | * | 8/1995 | Cidon et al. ................ | 370/452 |
| 5,475,685 A | | 12/1995 | Garris et al. | |
| 5,526,356 A | | 6/1996 | Kim et al. | |
| 5,572,526 A | | 11/1996 | Cidon et al. | |
| 6,026,425 A | * | 2/2000 | Suguri et al. ............... | 709/105 |
| 6,314,110 B1 | * | 11/2001 | Chin et al. .................. | 370/358 |

FOREIGN PATENT DOCUMENTS

EP         0 666 665        1/1995    ........... H04L/12/24

OTHER PUBLICATIONS

Kim, IEEE communicatios letters vol. 3 No. 4 Apr. 1999, A two–layer window–based fairness control scheme for rings with spatial reuse.*

Mayer, IEEE/ACM transactions on networking vol. 8 No. 3 Jun. 2000, Local and congestion driven fairness algorithm in arbitrary topology networks.*

IBM Disclosure Bulletin, "Asynchronous Priority Scheme for Full–Duplex Ring with Fairness", vol. 33 No. 1A, Jun. 1990, pp. 17–22.

Israel Cidon et al., *MetaRing—A Full–Duplex Ring with Fairness and Spatial Reuse*, IEEE Transactions on Communications, vol. 41, No. 1, Jan. 1993, pp. 110–120.

Israel Cidon et al., *Improved Fairness Algorithms for Rings with Spatial Reuse*, ISEE/ACM Transactions on Networking, vol. 5, No. 2, Apr. 1997, pp. 190–204.

T. Saito et al., *QoS Guarantees for High–speed Variable–length Packet LANs*, Faculty of Engineering, The University of Tokyo, Jul. 4, 1997.

Jean S.–C. Chen, *A Local Fairness Algorithm for Gigabit LAN's/MAN's with Spatial Reuse*, IEEE Journal on Selectd Areas in Communications, vol. 11, No. 8, Oct. 1993, pp. 1183–1192.

* cited by examiner

*Primary Examiner*—Hassan Kizou
*Assistant Examiner*—Dmitry Levitan
(74) *Attorney, Agent, or Firm*—Max R. Wood; Ogilvy Renault (57) ABSTRACT

An algorithm for media access control over nodes in a buffer insertion ring is described. Each node computes a local add rate and an advertised rate which it communicates to its upstream link partner node. The rate calculations are based on a locally computed tandem rate and a downstream rate received from a downstream link partner node. The algorithm ensures rapid convergence to a fair add rate at which nodes share link resources to avoid starvation in the ring. The advantages include short head of line delay, low operating overhead, and good bandwidth utilization.

14 Claims, 6 Drawing Sheets

FIG. 6

METHOD AND APPARATUS FOR MEDIA ACCESS CONTROL FOR PACKET TRANSMISSION OVER A BUFFER INSERTION RING

TECHNICAL FIELD

This invention relates to a media access control mechanism for packet transmission over a buffer insertion ring and, in particular, to an algorithm for ensuring local fairness in transmission resource sharing in a buffer insertion ring.

BACKGROUND OF THE INVENTION

Access control in a buffer insertion ring is designed for asynchronous transmission of variable size packets. A node in a buffer insertion ring can transmit a packet as long as its insertion buffer is empty. A packet arriving from an upstream ring access point (AP) is given non-preemptive priority over frames to be added at a downstream AP on a buffer insertion ring. In other words, ring traffic has preemptive priority over node traffic that is to be transmitted on the ring. If a downstream AP is in the process of adding a packet to the ring when a packet arrives from an upstream AP, then the upstream AP's packet is buffered temporarily. When the end of the added packet is transmitted, it is immediately followed by the buffered packet. The buffer insertion scheme can, however, result in a phenomenon known as a "starvation." An AP suffers from starvation when an upstream AP transmits continuously and blocks a downstream AP from access to the ring. When this occurs, the downstream AP is said to be "covered" by upstream ring traffic sources. The prevention of starvation in a buffer insertion ring requires a media access fairness mechanism to regulate access to the ring. An optimal solution quickly achieves fairness among traffic sources, and maximizes network throughput while maintaining a minimal ring access delay and contributing minimally to operating overhead.

Several fairness algorithms have been developed for controlling traffic in a buffer insertion ring. One such algorithm is the "SAT" algorithm described by Cidon in an article entitled "MetaRing a full-duplex ring with fairness and spatial reuse", IEEE Transactions on Communications, Vol. 41, No. 1, January 1993, pp. 110–120. The algorithm regulates access to the ring by use of a control signal called, an SAT that circulates in a direction opposite to the data traffic. Each AP in the ring is assigned a fixed transmit quota. The AP forwards the SAT upstream without delay unless it has been unable to satisfy its quota. The SAT is held by the AP until it has satisfied its quota, after which it will forward the SAT upstream. This algorithm suffers from the drawbacks associated with token control in a ring topology. Namely, the algorithm impacts throughput if a small quota allocation is selected. The algorithm also results in degraded access delay if nodes are granted large quotas. The algorithm likewise causes unnecessary losses of throughput in asymmetrically loaded rings.

Another algorithm referred to as the "FULL" algorithm is described by Saito et al in an article entitled "QOS Guarantees for high-speed variable-length packet LANs" available on the web site: www.sail.t.u-tokyo.ac.jp/pisai/research. The FULL algorithm is an enhancement to the SAT algorithm. The enhancement is enabled by assuming that the ring access logic implements a shortest path forwarding policy. Given such a policy, more than one SAT token is simultaneously applied on each half of the ring. The FULL algorithm provides a marginal improvement of about 10% on the performance of the original SAT algorithm but shares its drawbacks noted above.

Another algorithm developed for access control on buffer insertion rings is the REQ/GNT algorithm described in an article by Chen et al entitled "A local fairness algorithm for Gigabit LANs/MANs with spatial reuse", IEEE Journal on Selected Areas in Communications, Vol. 11, No. 8, October 1993, pp. 1183–1192. In accordance with the REQ/GNT algorithm, each AP operates in two modes: restricted and non-restricted mode. In restricted mode, a node can transmit only a predefined quota of data units. In non-restricted mode, the AP has free access to the ring yielding non-preemptive priority to the upstream traffic. A starved node triggers the fairness mechanism by sending a request message (REQ) upstream. On receipt of such a message, the upstream AP enters a restricted mode. If an AP that receives the REQ message cannot provide silence because it is receiving traffic from upstream sources, it will in turn forward the REQ message upstream. A node in restricted mode is permitted to add a fix quota of traffic to the ring. Once this quota is achieved, the node must cease transmission. After all upstream APs have transmitted their quota, the starved AP has a transmit opportunity. After the starved AP has transmitted its quota of traffic, it releases the upstream nodes from the restricted state by issuing a GNT message. Upon receiving a GNT message, the upstream AP follows similar rules. The upstream AP will in turn forward a GNT message upon satisfaction of its quota. The REQ/GNT algorithm offers better performance than the SAT and FULL algorithms and achieves more optimal throughput in asymmetrically loaded rings. However, the REQ/GNT algorithm falls short of the optimal throughput for certain traffic patterns and suffers from high head of line ring delay.

Each of the above-described algorithms suffers from shortcomings that are well known and acknowledged by their inventors. Specifically, the algorithms throttle throughput and contribute to head of line delay (HOL). HOL delay is defined as the amount of time a first packet in the add buffer of a node has to wait before it is inserted into the ring. Consequently, bandwidth utilization is not optimally achieved using these algorithms. One contributory factor is that high throughput and short HOL delay are often conflicting objectives.

There therefore exists a need for a fairness algorithm that provides both short HOL delay and high bandwidth utilization. There also exists a need for an algorithm that rapidly converges to a fair rate, is simple to implement, and readily scales with growth in ring topology.

OBJECTS OF THE INVENTION

It is therefore an object of the invention to provide a method of media access control for packet transmission over a buffer insertion ring which overcomes the disadvantages of prior art algorithms.

It is a further object of the invention to provide an adaptive rate control (ARC) algorithm that operates on the basis of rate calculations performed at each node in the ring.

It is a further object of the invention to provide an ARC algorithm that performs rate calculations using information available at each node as well as information received from a downstream link partner node.

It is yet a further object of the invention to provide a media access control algorithm in which each node computes its own local fair add rate as well as a rate which the node deems to be a fair add rate for its upstream link partner.

It is yet a further object of the invention to provide a media access control algorithm for packet transmission over a buffer insertion ring which runs continuously on the ring to regulate each node's access to the ring.

It is yet another object of the invention to provide an algorithm for media access control for packet transmission over a buffer insertion ring which contributes little to the operating overhead of the ring.

SUMMARY OF THE INVENTION

These and other objects of the invention are realized in a method of media access control for packet transmission over a buffer insertion ring, comprising steps performed by each node in the buffer insertion ring of:

computing at regular intervals a local packet add rate and an advertised packet add rate for an upstream link partner node;

communicating the advertised add rate to the upstream link partner node; and adding packets to the ring at a rate that does not exceed the local packet add rate until a new add rate is computed.

In accordance with a further aspect of the invention, there is provided a method of media access control for packet transmission over a buffer insertion ring in which a packet arriving from an upstream node in the ring is given non-preemptive priority over packets to be added to the ring, the method ensuring fair transfer resource sharing, comprising steps performed by each node in the buffer insertion ring of:

computing at regular intervals T a local packet add rate using the formula:

$$\mathrm{Add\_Rate}(nT) = (\mathrm{Add\_Rate}(nT-T) + \mathrm{DS\_Rate}(nT))/2$$

wherein:

Add_Rate(nT−T) is the add rate of an immediately preceding interval T; and

DS_Rate is an advertised rate of a downstream link neighbor node;

also computing at each interval nT an add rate for an upstream link partner node using the formula:

IF (Tandem_Rate(nT) is 0)
  Advertised_Rate(nT)=1
ELSE $$\mathrm{Advertised\_Rate}(nT) = \mathrm{Min}(1 - \mathrm{Tandem\_Rate}(nT) * (1 - \mathrm{EMPT}), \mathrm{DS\_Rate}(nT))$$

END IF
wherein:

Tandem_Rate is a number of bytes passing through a tandem buffer of the node, normalized to a link rate of the upstream link, during an interval $T_{STAT}$, $T \leq T_{STAT}$;

EMPT is a Boolean that indicates whether the node has any packets to send on the ring; and DS_Rate is the advertised rate of a downstream link neighbor node;

communicating the advertised add rate to the upstream link partner node; and adding packets to the ring at a rate that does not exceed the local packet add rate until a next local packet add rate is computed.

The ARC algorithm operates on the basis of rate calculations that are performed at each node. The rate calculations are performed using rate information available at each node as well as rate information received at the node from a downstream link partner. The rate information available at each node is the rate at which packets are received in the insertion buffer, known as the tandem traffic rate. The information received from the downstream link partner relates to a rate which the downstream link partner deems to be a fair add rate for the node. This is referred to as the advertised rate. The tandem traffic rate and the advertised rate are used to compute a local fair add rate. Each node uses its add rate as the fair add rate until the algorithm dictates that it perform a new rate calculation. The node can add traffic during an interval between add rate calculations only up to the maximum allowed by the calculated add rate. Once the node has achieved its add rate quota, the node is not permitted to add more traffic to the ring until after a next add rate calculation.

Each node communicates the advertised rate it calculates to its upstream link partner. The upstream link partner node, upon receipt of the advertised rate, uses it in the calculations of its own add rate as well as a new advertised rate that it transmits to its own upstream link partner node. This process continuously runs on the ring, constantly regulating each node's access to the ring. Simulation results have confirmed that the ARC fairness algorithm adjusts the add rate of each node to a fair value. The adjustment is rapidly achieved even under a heavy traffic load in which each node transmits at its full rate to its further downstream node.

BRIEF DESCRIPTION OF THE DRAWINGS

The invention will now be described by way of example only and with reference to the following drawings in which.

DETAILED DESCRIPTION OF THE PREFERRED EMBODIMENTS

This invention relates to a method of media access control for packet transmission over a buffer insertion ring to ensure local fairness using a negative feedback control system to minimize error between an actual add rate of each node and an ideal value for the add rate. The method ensures that adequate information is carried to upstream nodes to permit each node to apply the information in a calculation of a local fair add rate.

Figure 1:
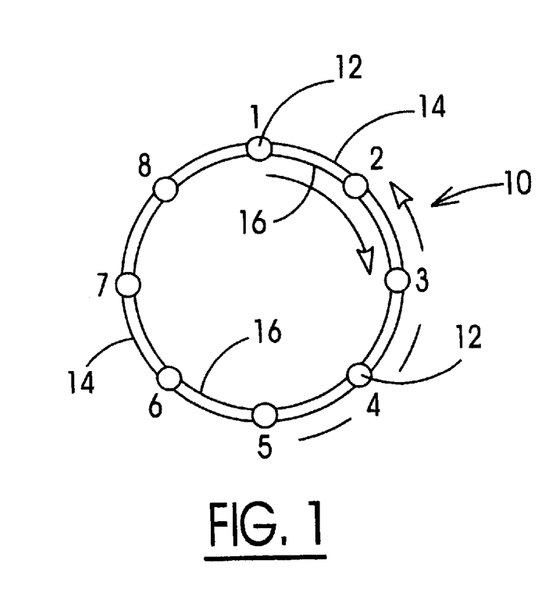
FIG. 1 is a schematic diagram of an insertion buffer ring known as a dual counter-rotating insertion buffer ring.

The method of media access control, hereinafter referred to as the Adaptive Rate Control (ARC) algorithm operates on the basis of rate calculations performed at each node in a buffer insertion ring. An exemplary buffer insertion ring 10 is shown in FIG. 1. This type of ring is known as a dual counter-rotating buffer insertion ring, the construction and operation of which are well known in the art. The buffer insertion ring 10 consists of a plurality of nodes 12 also referred to as access points (AP). In this document, the terms "node" and "AP" are synonymous. Each node 12 is connected to adjacent neighbor nodes by a pair of fiber optic links 14 and 16 which respectively transfer information in opposite directions between the nodes. The capacities of the fiber optic links 14 and 16 are not necessarily balanced between nodes or within the buffer insertion ring 10.

ARC rate calculations are performed at each node 12. The rate calculations are performed using a tandem traffic rate available at each node, and rate information received at the node from a downstream link partner. The tandem traffic rate is a normalized count of the number of bytes passing through the node's tandem buffer during a predefined time period, as will be explained below in more detail. The rate information received at the node from the downstream link partner is referred to as the advertised rate, the calculation of which is also explained below in detail. At regular intervals, each node 12 computes two rates, a local add rate, hereinafter referred to as the Add_Rate, and the rate which the local node deems to be a fair add rate for its upstream link partner, hereinafter referred to as the Advertised_Rate. The node 12 uses the Add_Rate as its fair add rate until the next rate calculation. Each node 12 therefore adds traffic during an interval between calculations up to a maximum permitted by the calculated Add_Rate. Once the node has added traffic equivalent to the Add_Rate, the node stops adding traffic until a new Add_Rate is computed.

Each node 12 communicates its Advertised_Rate to its upstream link partner. The upstream node 12, upon receipt of the Advertised_Rate applies it to the calculations of its Add_Rate as well as a new Advertised_Rate that is sent to its upstream link partner. This process continuously runs on the ring, regulating the access of each node 12 to the ring.

Rate Calculations

Rate calculations are based on information collected over a predetermined interval. The predetermined interval is defined as $T_{STAT}$. The interval is referred to as "statistics window" during which a node computes its Tandem_Rate. The Tandem_Rate is a running total of the number of bytes passing through the node's tandem buffer during the time $T_{STAT}$. The Tandem_Rate, and all other calculated rates referred to below, are noralized to the link rate. The two rate calculations are performed periodically at a time that may be independent of the statistics window. The rate calculation interval is referred to as a messaging interval T, wherein $T \leq T_{STAT}$. When the messaging interval expires at a time nT (where n is an integer and $n \geq 20$), or when an Advertised_Rate is received from the downstream node, a new Add_Rate is calculated for the node and a new Advertised_Rate is calculated and sent to the upstream link partner. The Advertised_Rate received from a downstream link partner is referred to as the DS_Rate at the receiving node 12.

Add Rate

When the time interval nT expires, or when an Advertised_Rate is received from the downstream node, a new Add_Rate is calculated by a node 12 as follows:

$$\text{Add\_Rate}(nT) = (\text{Add\_Rate}(nT-T) + \text{DS\_Rate}(nT))/2$$

This equation models an integrator, and forces Add_Rate to converge to DS-Rate after a few time intervals nT. This can be demonstrated by taking a z-transform of the above equation, solving it in the z-domain, and converting the result into the discrete time domain. The result of the above integrator may be expressed as:

$$\text{Add\_Rate}(nT) = (1-(\tfrac{1}{2})^n)\,\text{DS\_Rate}(nT) + (\tfrac{1}{2})^n \text{Add\_Rate}(0).$$

If $n \to \infty$, then Add_Rate $\to$ DS_Rate.

In practice, only a few time intervals nT are required before the output of the integrator stabilizes. For example, it takes less than five time intervals T for the Add_Rate to converge within about 97% of the DS_Rate. In effect, the Add_Rate of each node is adjusted to a rate that has been advertised from its downstream node. This adjustment process progresses smoothly and in a very few time intervals T.

Advertised Rate

Each time the interval nT expires, or an Advertised_Rate is received from the downstream node, a new Advertised_Rate is calculated as follows:

IF (Tandem_Rate(nT) is 0)
    Advertised_Rate(nT)=1
ELSE $$\text{Advertised\_Rate}(nT) = \text{Min}\,(1-\text{Tandem\_Rate}(nT)\,(1-\text{EMT}),\;\text{DS\_Rate}(nT))$$

END IF

If Tandem_Rate is 0, indicating that no upstream node has sent traffic that passes through a node 12 performing this calculation, then a rate of 1 is advertised to the upstream link partner. This Advertised_Rate informs the upstream link partner that it has full access to the ring during the next messaging interval nT. Advertising a rate of 1 indicates that a node 12 has no effect on the regulated traffic of some other segment of the ring, and prevents the local traffic on separate segments of the ring from interfering with each other. In the calculation set forth above, the ELSE condition compensates for a case in which a node 12 receives traffic in its tandem buffer. In that case, the minimum of DS_Rate and (1−Tandem_Rate*(1−EMPT)) is advertised to the upstream node. The variable EMPT is a Boolean that indicates whether the node has packets to add to the ring. If the node has no packets to add to the ring, the EMPT flag is set to 1, and the left hand term within the Min function becomes 1. Consequently, whatever is in DS_Rate will be advertised to the upstream node. If the EMPT is set to 0, indicating that the node has packets to add to the ring, the advertised rate becomes:

$$\text{Advertised\_Rate}(nT) = \text{Min}(1-\text{Tandem\_Rate}(nT),\,\text{DS\_Rate}(nT)).$$

The Min function ensures that the DS_Rate message received from a downstream link partner is passed from a node 12 towards its upstream link partner so that it eventually reaches a node responsible for an unfair contribution to traffic load at some other AP in the ring. A node 12 nearest a congested link computes (1−Tandem_Rate) and the other nodes pass this Advertised_Rate to their upstream link partners because of the Min function. If a group of K nodes are sharing a link to transfer traffic to a specific AP, when steady state is achieved, all K nodes are transmitting at a fair rate of 1/K. The Tandem_Rate at the node nearest the congested link would be (K−1)/K. When the node nearest the congested link advertises (1−Tandem_Rate), it is equivalent to 1−(K−1)/K=1/K. Consequently, the rate advertised by the node nearest to a congested link is equal to the fair rates for all nodes sharing the congested link. Since the nodes adjust their Add_Rate to the Advertised_Rate, a fair access is rapidly achieved for each node 12 in a group of nodes adding traffic to the ring. Note that the effect of this calculation is that the Advertised_Rate throttles the Add_Rate of a node 12 during each messaging period nT, so that a node 12 can never exceed that limit.

The term (1−Tandem_Rate) can be considered as negative feedback sent to the upstream link partner. If during a previous messaging interval nT, the Tandem_Rate was a large number, meaning that the upstream link partner had a great deal of opportunity to add its traffic to the ring, and in a subsequent message the Advertised_Rate is a small number, the Add_Rate to the upstream link partner for the next interval nT is reduced accordingly. The algorithm rapidly regulates traffic because each node sends the Advertised_Rate to only its upstream link partner and the messaging interval nT is relatively short. The messages are independently sent from each node 12 to its upstream link partner. Therefore, all nodes are continuously adapting their rates, and adding their packets to the ring at the adapted rate. This eliminates long delays and the resulting wastage of bandwidth that has been observed in token-based algorithms.

Algorithm Logic

Figure 2A:
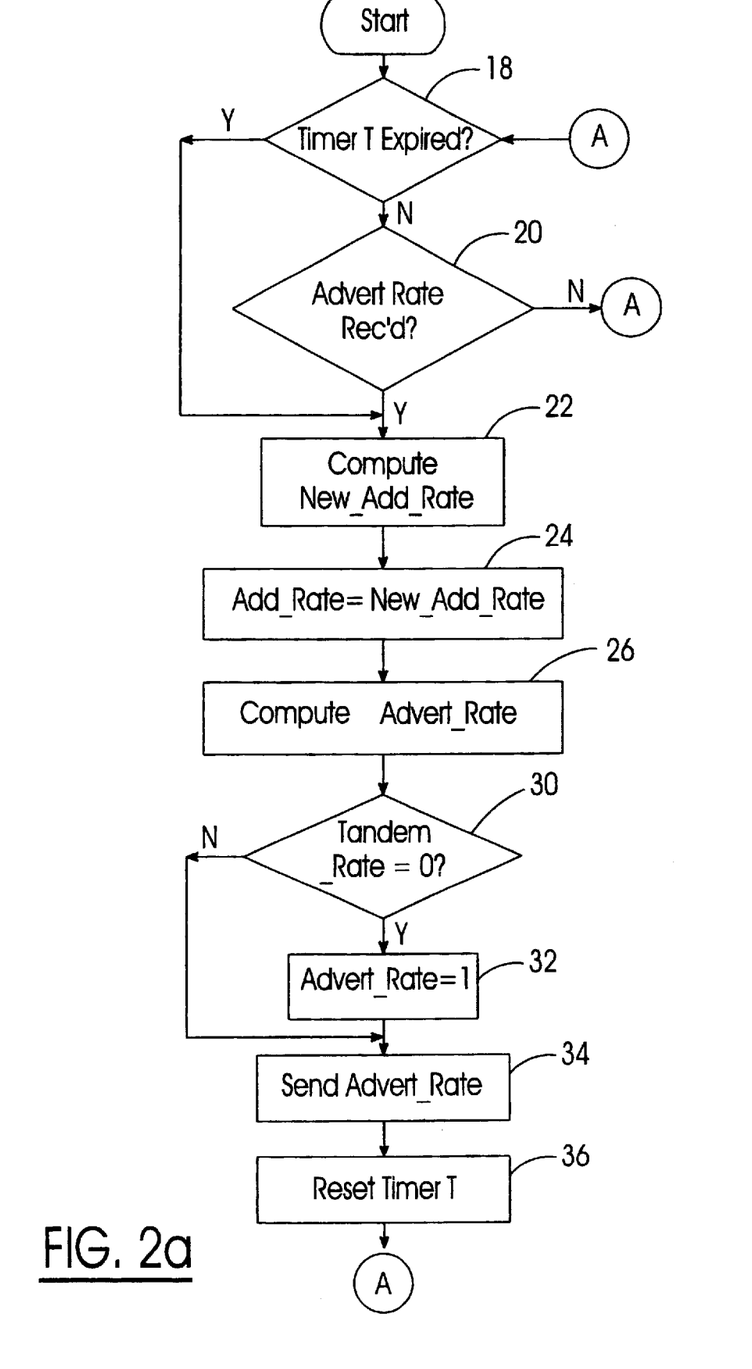
FIGS. 2a and 2b are a flow diagram illustrating the logic of the ARC algorithm.

FIG. 2a is a flow diagram of the logic used in a first process executed by the ARC fairness algorithm. In step 18, a timer is checked to determined whether the interval T has expired. If not, in step 20, a register is checked in step 20 to determine whether a new Advertised_Rate has been received from a downstream link partner. If not, the program loops back to step 18. If a new AdvertisedRate is received or the timer is expired, a New_Add_Rate is computed in step 22 using the equation described above. The Add_Rate is set to the New_Add_Rate in step 24 and a new Advertised_Rate is computed in step 26. In step 30, the Tandem_Rate is examined to determine whether any packets have been tandemed during the interval T. If no packets were tandemed, (Tandem_Rate=0), the Advertised_Rate is set to "1" in step 32. This ensures that a node does not propagate an advertised rate less than 1 if the node itself is the source of the traffic. The Advertised_Rate is then sent to the upstream link neighbor in step 34. The timer T is reset to an initial value in step 36, and the process loops back to step 18.

Figure 2B:
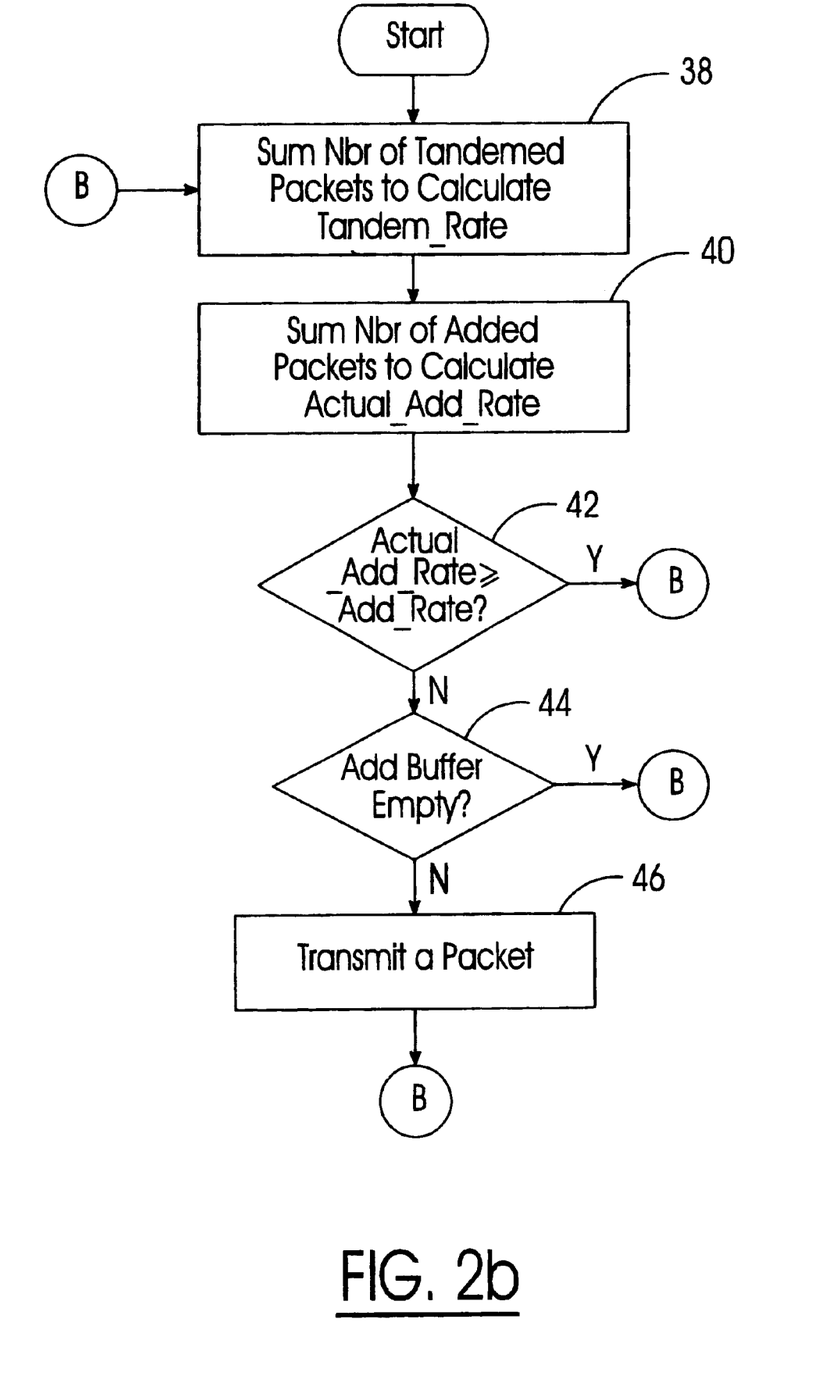

FIG. 2b is a flow diagram of the logic used in a second process executed by the ARC fairness algorithm. The first and second processes shown in FIGS. 2a, b run independently in parallel.

In step 38, the number of tandemed packets is summed to calculate the Tandem_Rate. The tandemed packets are preferably tracked using a sliding window ($T_{STAT}$) which is described below in more detail. In step 40, the number of packets added to the ring are summed to calculate an Actual_Add_Rate. The Actual_Add_Rate is likewise tracked using a sliding window ($T_{STAT}$). The Actual_Add_Rate is compared to the Add_Rate in step 42. If the Actual_Add_Rate is greater than or equal to the Add_Rate, the process branches back to step 38. Otherwise, the process checks the Add_Buffer in step 44. If the Add_Buffer is empty, the process branches back to step 38. If not, a packet is transmitted in step 46 and the process branches back to step 38 after the packet has been sent.

As described above, the algorithm ensures that the DS_Rate is passed on towards the node that is responsible for the unfairness at some other part of the ring. Consequently, the logic shown in FIGS. 2a, b ensures the fair sharing of resources responsive to actual traffic loads.

Computation of the Messaging Timer (T)

The Advertised_Rate should be propagated with a minimum delay. This means that the Advertised_Rate should be inserted in the header of every frame going upstream. If after waiting for a time equivalent to a transmission time for a maximum size packet, no frame has passed the node in an upstream direction, a new frame should be generated and sent upstream to carry the Advertised_Rate. Thus, the messaging timer is preferably set to $$T = MaxPacketSize * 8/LineRate$$

Wherein:

T is the period of the message timer;

MaxPacketSize is the time required to transmit a packet of the maximum size supported by the ring; and LineRate is the speed in bits/second of the link.

Computation of the Statistics Window ($T_{STAT}$)

The sliding statistics window ($T_{STAT}$) should be large enough to reflect the actual rates, and prevent unnecessary overshoots and undershoots in the calculated rates. The larger the $T_{STAT}$, the smoother are changes in the rates. On the other hand, a large statistics window collects a long history, makes the transitions slow, and does not reflect an immediate change in the rate. This may cause problems for nodes that need immediate access to the ring to burst a datastream. A formula for relating the sliding window size to the network parameters is explained with reference to Table 1. The nodes represented in the table are a node "j" and a node "i", which is upstream of the node j, as well as intermediate nodes "j+1", which is a first node upstream of node j, and node "i+1" which is a first node downstream of node i.

The node i is sending packets to the node j. Node j is advertising a rate to node i to regulate the traffic. The maximum distance between node i and node j in a dual counter rotating ring is N/2, where N is the total number of nodes on the ring. Each event on this network takes a time listed in Table 1. In Table 1, the propagation delay on the media is assumed 5 $\mu$sec/km, AveLinkLength is the average distance between two nodes in km, and LineRate is the ring bandwidth in bit/sec.

TABLE 1

The time required for various events on the network.

| Time | Action |
|---|---|
| 0 | Node j calculates a new Advertised Rate. |
| T (or MaxPacketSize * 8/LineRate) | Node j inserts the Advertised_Rate in the header of the next packet. |
| 5 $\mu$sec * AveLinkLength | Advertised_Rate travels from node j to node j−1. |
| 5 $\mu$sec * AveLinkLength | The first packet transmitted by node i using the new Add_Rate arrives at node i+1. |
| MaxPacketSize * 8/LineRate | The maximum delay that this packet experiences at node i+1 (because of insertion buffer) before leaving node i+1. |

In an extreme case, the traffic sent from ode i takes the following time to get to node j:

$$N/2 * [5 \mu sec * AveLinkLength) + MaPacket Size * 8/LineRate)].$$

Consequently, the change in the Tandem_Rate of node j (and its Advertised_Rate) takes the following time to get to node i:

$$N/2*[T+5 \mu sec*AveLinkLength)].$$

The total time required for node j to sense a change in its Tandem_Rate is the sum of the two-times computed above:

$$N/2*[10 \mu sec*AveLinkLength)+(MaxPacketSize*8/LineRate)+T].$$

To obtain a good measure of the Tandem_Rate of node j, the sliding statistics window should be larger than the total time by a factor of 2 or 3:

$$T_{STAT} >> N/2*[(10 \mu sec*AveLinkLength)=(MaxPacketSize*8/LineRate)+T].$$

EXAMPLE 1

Figure 3A:
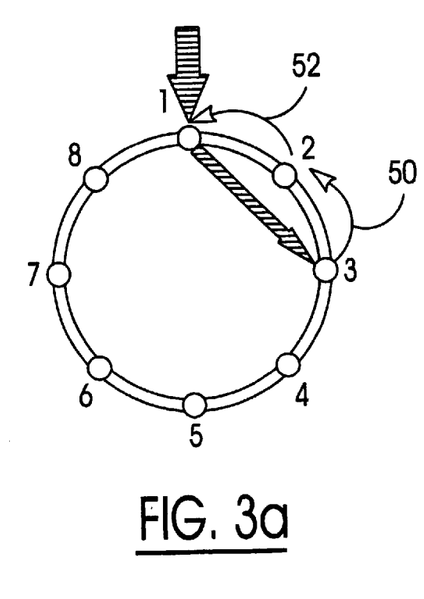
FIG. 3a, which appears on sheet one of the drawings, is a schematic diagram of the insertion buffer ring shown in FIG. 1 in which only node 1 is sending packets to node 3, and the packets are being sent at a full link rate.

FIGS. 3a, b and 4a, b illustrate how the ARC algorithm affects traffic on a buffer insertion ring. As schematically illustrated in FIG. 3a, node 1 is sending traffic at full rate to node 3, while node 2 is silent. Since the Tandem_Rate of node 3 is 0, it sends an Advertised_Rate message 50 having a value of 1 to node 2. Node 2 also advertises a rate of 1 to node 1 by sending a message 52, because its add buffer is empty (EMPT=1). Consequently, node 1 is advised that it can send the traffic at full rate to node 3. In fact, if node 1 starts adding its traffic at a rate less than 1, it will rapidly increase its Add_Rate to the full rate after a few intervals nT. As will be apparent from the discussions above, the Add_Rate of nodes 2 and 3 is also incremented to 1, although nodes 2 and 3 currently have no packets to add to the buffer insertion ring 10.

Figure 3B:
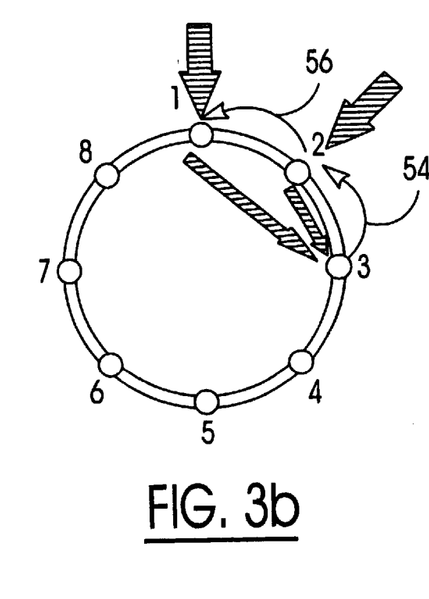
FIG. 3b, which appears on sheet one of the drawings, shows the buffer insertion ring shown in FIG. 2 when node 2 commences sending traffic to node 3, and nodes 1 and 2 balance their respective transmit rates to a fair rate under the influence of the ARC algorithm.
Figure 4A:
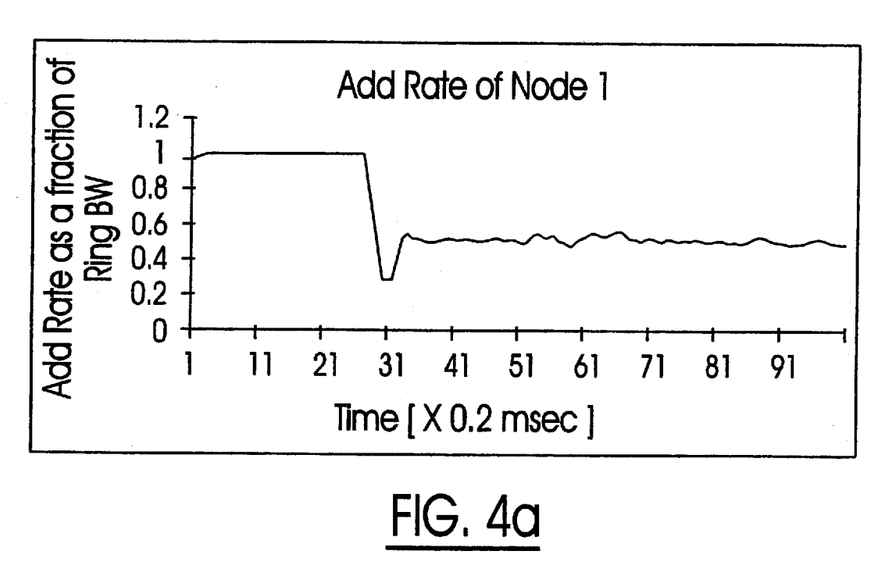
FIG. 4a is a graph of the normalized add rate of node 1 during a time period schematically illustrated in FIGS. 3a and 3b.
Figure 4B:
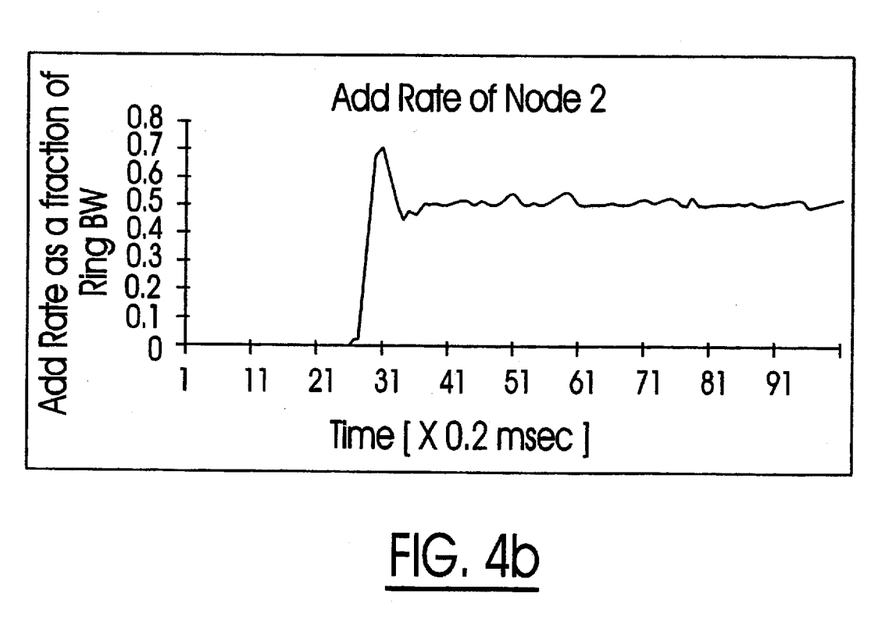
FIG. 4b is a graph showing the normalized add rate of node 2 during the time period schematically illustrated in FIGS. 3a and 3b.

As seen in FIG. 3b, node 2 receives traffic to be added to the ring. At the next message interval nT, node 3 advertises a rate of 1 to node 2 in a message 54, but node 2 advertises a rate of close to 0 to node 1 in a message 56. This is due to the fact that node 2 has the packets in its add buffer to add to the ring (EMPT=0). The Advertised_Rate message 56 from node 2 dramatically slows down the transmission rate of node 1. Meanwhile, node 2 starts transmission as the buffer insertion scheme permits it. Accordingly, node 2 buffers upstream traffic coming to its tandem buffer while starting transmission of its own packets on the buffer transmission ring 10. For every packet that node 2 injects into the buffer insertion ring 10, there may be one or more packets received and stored temporarily in its tandem buffer, which is only sized to accommodate a maximum packet length permitted on the buffer insertion ring 10. When the interval nT expires at node 2, it increments its Add_Rate. The Advertised_Rate is correspondingly changed. If the Advertised_Rate was close to 0 during the previous interval, node 1 was substantially inhibited from sending packets during that interval and the result of the term (1−Tandem_Rate) increases accordingly. This process continues for a few intervals nT until both node 1 and node 2 get equal access to the buffer insertion ring 10. FIGS. 4a and 4b respectively show the normalized add rates of node 1 and node 2 during the interval schematically illustrated in FIGS. 3a and 3b.

This example was simulated using an event driven simulator. The buffer insertion ring 10 was operated at OC-12 with 16 gigabit nodes on the ring. The distance between each node was about 1 kilometer. The messaging interval nT was 200 $\mu$sec, and the statistics window $T_{STAT}$ was 500 $\mu$sec.

EXAMPLE 2

Figure 5:
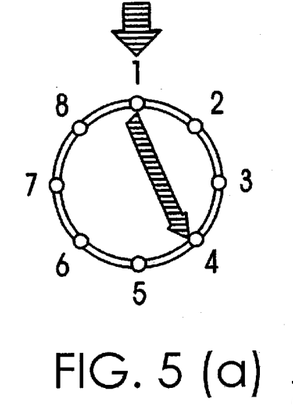
FIGS. 5a–5e schematically illustrate an example in which node 1 transmits packets at a full rate to node 4 while nodes 2 and 3 also transmit packets to node 4 for a short period of time.

FIGS. 5a–5e illustrate a further example in which node 1 is transmitting at full rate. In FIG. 5a, the fair rate for node 1 is 1 because all other nodes are silent. As shown in FIG. 5b, node 2 starts adding traffic to the buffer insertion ring 10. The fair rate of nodes 1 and 2 under the influence of the ARC algorithm rapidly migrates to 0.5, respectively. After some time, node 3 also starts adding packets to the buffer insertion ring 10, as shown in FIG. 5c. The fair rate for nodes 1, 2 and 3 at that time migrates to 0.333. To determine how quickly the rates converge, node 3 and subsequently node 2 are deprived of traffic to be added to the ring as shown in FIGS. 5d and 5e. In response, the fair rate of node 1 increases to 0.5 and then returns to 1.

Figure 6:
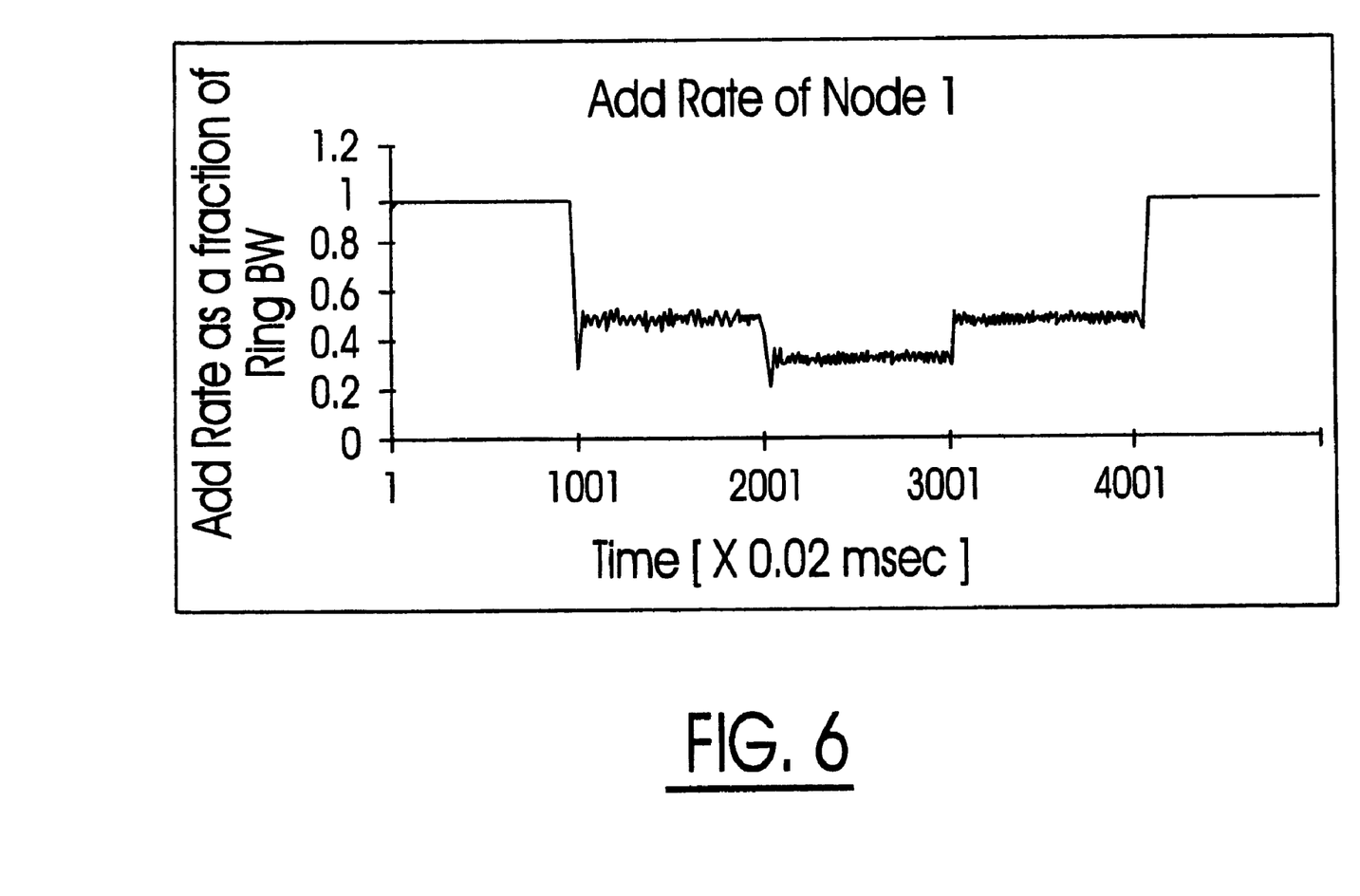
FIG. 6 is a graph illustrating the normalized add rate of node 1 during the packet transmit sequence shown in FIGS. 5a–e.

This example was simulated using the same network configuration described above with reference to Example 1. The messaging interval nT was 20 $\mu$sec, and the statistics window $T_{STAT}$ was 500 $\mu$sec. The simulation result for the Add_Rate of node 1 is shown in FIG. 6. As is evident, the rate converges to a fair value within a very few messaging intervals nT.

Fast Convergence

When a node calculates a new advertised rate and sends the new rate to its upstream link partner, the upstream link partner takes action to respond. Consequently, it requires at most two message period delays until a node 12 that has sent an advertised rate can sense a change in the incoming traffic to its tandem buffers. Assuming shortest path forwarding, the distance between the most distant nodes in an insertion buffer ring is N/2 hops where N is the total number of nodes in the ring. If a most distant node is the source of congestion on a link, it will take one round trip delay before the node that is sent an advertised rate can sense the change in its tandem traffic. The rates smoothly converge to fair values because the integrator implemented in the algorithm changes the rates in a smooth, stepwise progression.

Overhead Contribution

As noted above, the algorithm adds only one byte per frame per messaging interval to the operating overhead of the buffer insertion ring 10. If there are frames passing a node in its upstream direction, the overhead byte can be written into the headers of the frames, assuming that the network protocol enables such a process. Link integrity messages are frequently sent from each node 12 to its upstream link partner. The Advertised_Rate can be written in such frames. Even if the link to the upstream node is empty when nT=0, a new minimum size packet can be generated to carry the Advertised_Rate to the upstream link partner. In that case, because the link is empty, the overhead generated by the message does not affect traffic on the ring.

Distributed Algorithm

The information required to calculate a new rate at each node is locally collected in a few registers. The message timer at each node can work independently from timers in other nodes and there is no need to synchronize the timers between nodes.

Linear Topology

It should also be noted that as long as a node has access to its upstream link neighbor and can send an advertised rate to its upstream link neighbor, the traffic can be regulated using the ARC algorithm. Consequently, even if the ring is broken, the algorithm still functions on any remaining portions of the ring.

HOL Delay

The algorithm also ensures a short head of line (HOL) delay. HOL delay is defined as the time that a frame waits at the head of an add buffer before it gets access to the buffer insertion ring 10. For quality of service support, the HOL delay must be as short as possible. In prior art algorithm, the HOL delay could be significant under certain circumstances.

The ARC algorithm provides all nodes with continuous access to the ring, and the access is alternated among nodes that are sharing a link. The HOL delay is therefore reduced and maintained within acceptable limits. Providing a low HOL delay is a significant advantage of the ARC algorithm in comparison with prior art fairness algorithms.

Bandwidth Reservation

In order to guarantee an upper bound on HOL delay for real time and mission critical traffic, a fraction of the bandwidth of the buffer insertion ring 10 can be reserved. This also enables an idle node to start adding traffic immediately at a reserved rate before its AdvertisedRate propagates to upstream nodes and rate regulation is enforced. Bandwidth reservation can be simply implemented in a network which operates under the ARC algorithm. In the program logic described with reference to FIG. 2a, all rates are normalized to the link rate and the Advertised_Rate is represented as number between 0 and 1. In the statement (1−Tandem_Rate) used in the computation of the Advertised_Rate described above, the number 1 represents the total bandwidth of the ring. If the 1 is replaced with a smaller number less than 1, referred to as the Max_Unreserved_Rate, then a fraction of the bandwidth of the buffer insertion ring 10 will not be controlled by the ARC algorithm, and will be reserved. The reserved bandwidth can be shared equally among nodes, if desired. For example, if Max_Unreserved_Rate is set to 0.8, 20% of the capacity of ring 10 is reserved for real time and mission critical traffic, and 80% of the ring capacity is used by delay tolerant traffic.

Changes and modifications to the above-described embodiments will no doubt be apparent to those skilled in the art. The scope of the invention is therefore intended to be limited solely by the scope of the appended claims.

We claim:

1. A method of media access control for packet transmission over a buffer insertion ring, comprising steps performed by each node in the buffer insertion ring of:

computing at regular intervals a local packet add rate based on information collected over an interval $T_{STAT}$, the regular intervals having a duration T, wherein $T<T_{STAT}$, using the formula:

$$Add\_Rate(nT)=(Add\_Rate(nT-T)+DS\_Rate(nT))/2$$

wherein:

Add_Rate(nT−T) is the add rate of the immediately preceding interval T; and

DS_Rate is the advertised rate of a downstream link partner node;

computing at the same time an advertised packet add rate for an upstream link partner node and communicating the advertised add rate to the upstream link partner node; and adding packets to the ring at a rate that does not exceed the local packet add rate until a new local packet add rate is computed.

2. A method as claimed in claim 1 wherein each node computes a Tandem_Rate over a statistics window having a duration of $T_{STAT}$, the Tandem_Rate being a number of bytes passing through a tandem buffer of the node, normalized to the link rate of the upstream link.

3. A method as claimed in claim 2 wherein the statistics window $T_{STAT}$ is a sliding window to preserve a history of the local add rate and tandem rate in order to enable accurate computation of the rates.

4. A method as claimed in claim 2 wherein the advertised rate is computed as follows:

IF (Tandem_Rate is 0)
    Advertised_Rate(nT)=1
ELSE $$Advertised\_Rate(nT)=Min(1-Tandem\_Rate(nT)*(1-EMPT), DS\_Rate(nT))$$

END IF wherein:

EMPT is a Boolean that indicates whether the node has any packets to send on the ring.

5. A method as claimed in claim 1 wherein the advertised rate is communicated to the upstream link partner node by inserting the advertised rate in the header of a frame being sent in the upstream direction.

6. A method as claimed in claim 5 wherein the advertised rate is communicated to the upstream link partner node in a link integrity message frame sent to the upstream link partner node.

7. A method as claimed in claim 6 wherein the advertised rate is inserted in a new minimum sized frame if the link to the upstream link partner node is empty, and the new frame is communicated to the upstream link partner node.

8. A method as claimed in claim 1 wherein the time intervals T and $T_{STAT}$ are computed by at least one timer in each node and the timers in different nodes are not synchronized.

9. A method as claimed in claim 2 wherein a portion of a bandwidth of the ring is fairly shared and a portion is reserved for another purpose, and the advertised rate is computed using the formula:

IF (Tandem_Rate is 0)
    Advertised_Rate(nT)=1
ELSE $$Advertised\_Rate(nT)=Min(Max\_Unreserved\_Rate-Tandem\_Rate(nT)*(1-EMPT), DS\_Rate(nT))$$

END IF wherein:

Max_Unreserved_Rate is the fairly shared portion of the bandwidth of the ring; and EMPT is a Boolean that indicates whether the node has any packets to send on the ring.

10. A method as claimed in claim 9, wherein the buffer insertion ring is a Dual Counter Rotating Buffer Insertion Ring.

11. A method of media access control for packet transmission over a buffer insertion ring in which a packet arriving from an upstream node in the ring is given non-preemptive priority over packets to be added to the ring, the method ensuring fair transfer resource sharing, comprising steps performed by each node in the buffer insertion ring of:

computing at regular intervals T a local packet add rate using the formula:

$$Add\_Rate(nT)=(Add\_Rate(nT-T)+DS\_Rate(nT))/2$$

wherein:

Add_Rate(nT−T) is the add rate of an immediately preceding interval T; and

DS_Rate is an advertised rate of a downstream link partner node;

also computing at each interval T an add rate for an upstream link partner node using the formula:

```
IF (Tandem_Rate is 0)
    Advertised_Rate(nT)=1
ELSE

Advertised_Rate(nT)=Min(1-Tandem_Rate(nT)*(1-EMPT),
        DS_Rate(nT))

END IF
```
wherein:
- Tandem_Rate is a number of bytes passing through a tandem buffer of the node, normalized to a link rate of the upstream link, during an interval $T_{STAT}$, $T \leq T_{STAT}$;
- EMPT is a Blooelan that indicates whether the node has any packets to send on the ring; and
- DS_Rate is the advertised rate of a downstream link partner node;
- communicating the advertised add rate to the upstream link partner node; and
- adding packets to the ring at a rate that does not exceed the local packet add rate until a next local packet add rate is computed.

12. A method as claimed in claim 11 wherein a portion of a bandwidth of the ring is fairly shared and a portion is reserved for another purpose, and the advertised rate is computed using the formula:

```
IF (Tandem_Rate is 0)

Advertised_Rate(nT)=1

ELSE

Advertised_Rate(nT)=Min(Max_Unreserved_Rate-Tandem_
        Rate(nT)*(1-EMPT), DS_Rate(nT))

END IF
```
wherein:
- Max_Unreserved_Rate is the fairly shared portion of the bandwidth of the ring.

13. In a buffer insertion ring, nodes adapted for media access control of packet transmission over the ring, each node comprising:
- means for computing at regular intervals nT a local packet add rate using the formula:

Add_Rate(nT)=(Add_Rate(nT-T)+DS_Rate(nT))/2 wherein:
- Add_Rate(nT-T) is the add rate of an immediately preceding interval T; and
- DS_Rate is an advertised rate of a downstream link neighbor node;
- means for computing at each interval nT an add rate for an upstream link partner node using the formula:

```
IF (Tandem_Rate is 0)
    Advertised_Rate(nT)=1
ELSE

Advertised_Rate(nT)=Min(1-Tandem_Rate(nT)*(1-EMPT),
        DS_Rate(nT))

END IF
```
wherein:
- Tandem_Rate is a number of bytes passing through a tandem buffer of the node, normalized to a link rate of the upstream link, during an interval $T_{STAT}$, $T \leq T_{STAT}$;
- EMPT is a Boolean that indicates whether the node has any packets to send on the ring; and
- DS_Rate is the advertised rate of a downstream link partner node;
- means for communicating the advertised add rate to the upstream link partner node; and
- means for adding packets to the ring at a rate that does not exceed the local packet add rate until a next local packet add rate is computed.

14. A computer readable memory, comprising:
- instructions for computing at regular intervals nT a local packet add rate for a node in a buffer insertion ring using the formula:

Add_Rate(nT)=(Add_Rate(nT-T)+DS_Rate(nT))/2 wherein:
- Add_Rate(nT-T) is the add rate for the node during an immediately preceding interval T; and
- DS_Rate is an advertised rate received from a downstream link neighbor node;
- instructions for computing at each interval nT an add rate for an upstream link partner node using the formula:

```
IF (Tandem_Rate is 0)
    Advertised_Rate(nT)=1
ELSE

Advertised_Rate(nT)=Min(1-Tandem_Rate(nT)*(1-EMPT),
        DS_Rate(nT))

END IF
```
wherein:
- Tandem_Rate is a number of bytes passing through a tandem buffer of the node, normalized to a link rate of the upstream link, during an interval $T_{STAT}$, $T \leq T_{STAT}$;
- EMPT is a Boolean that indicates whether the node has any packets to send on the ring; and
- DS_Rate is the advertised rate of a downstream link partner node;
- instructions for communicating the advertised add rate to the upstream link partner node; and
- instructions for adding packets to the ring at a rate that does not exceed the local packet add rate until a next local packet add rate is computed.

* * * * *

UNITED STATES PATENT AND TRADEMARK OFFICE
CERTIFICATE OF CORRECTION

PATENT NO. : 6,614,805 B1
DATED : September 2, 2003
INVENTOR(S) : Bijan Raahemi et al.

It is certified that error appears in the above-identified patent and that said Letters Patent is hereby corrected as shown below:

Column 5,
Line 54, "$n \geq 20$" to -- $n \geq 0$ --.

Column 8,
Line 33, "j+1" should read -- j-1 --.

Column 11,
Line 41, "$T < T_{STAT}$" should read -- $T \leq T_{STAT}$ --.

Column 13,
Line 13, "Bloolean" should read -- Boolean --.

Signed and Sealed this

First Day of June, 2004

JON W. DUDAS
*Acting Director of the United States Patent and Trademark Office*